Patented Aug. 5, 1947

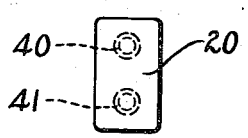
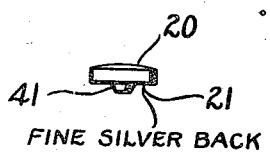
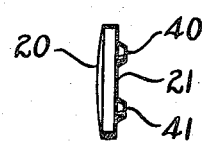
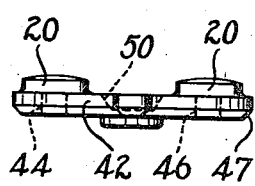
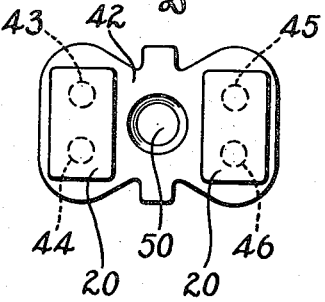
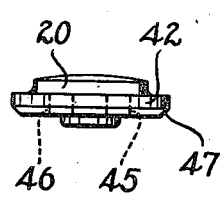
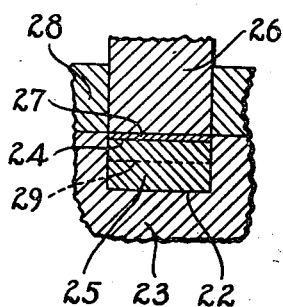
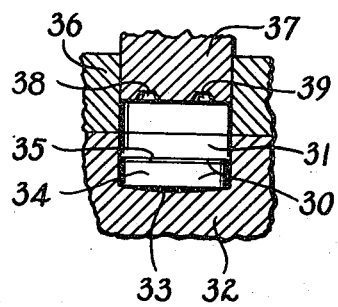
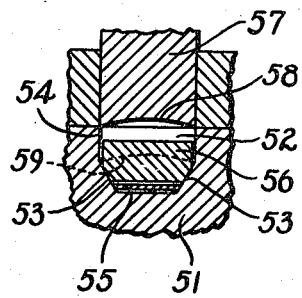
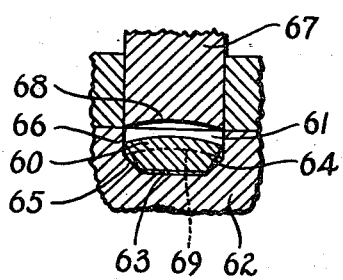

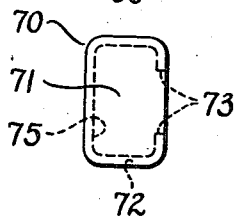
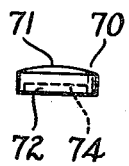
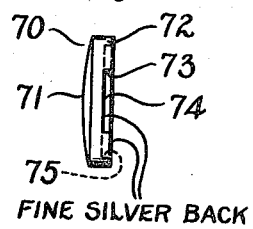
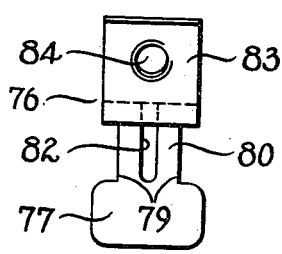
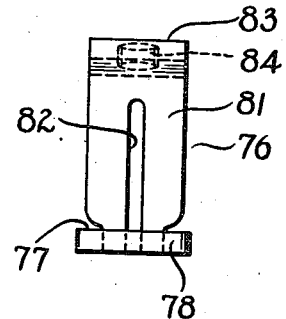
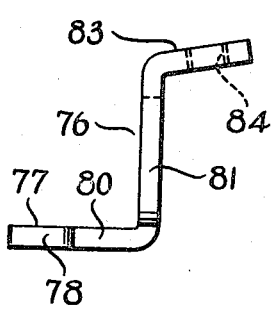
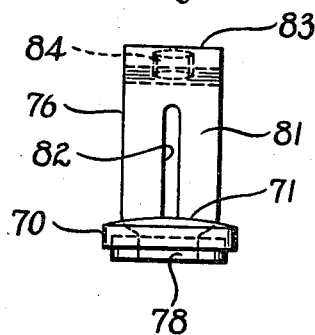
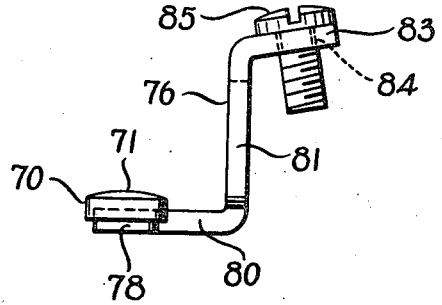

2,425,053

UNITED STATES PATENT OFFICE 2,425,053

SILVER-BACKED NONWELDING CONTACT AND METHOD OF MAKING THE SAME

Merle R. Swinehart, Milwaukee, Wis., assignor to Cutler-Hammer, Inc., Milwaukee, Wis., a corporation of Delaware Application June 23, 1944, Serial No. 541,837

8 Claims. (Cl. 200—166)

This invention relates to improvements in silver-backed non-welding contacts and methods of making the same.

A primary object is to provide a novel form of fine silver backing for a molded contact having non-welding characteristics when in use.

Another object is to provide means formed integrally with a molded contact body of non-welding powder composition to facilitate attachment thereof to a metal support by welding or brazing.

Another object is to provide for use of a molded and heat sintered preform consisting of a relatively thick layer of the non-welding contact material and a relatively thin layer of the fine silver backing material for molding under relatively high pressure a contact of the desired form attachable by welding or brazing to a metal support.

Another object is to provide a heat sintered preform composed of partially compressed layers of powders one of which is adapted to form a non-welding contact tip and the other of which is adapted to form a fine silver backing therefor when the preform is subjected to a final high molding pressure.

Another object is to provide novel methods of making non-welding contacts of the aforementioned character.

Another object is to provide novel and simple means for facilitating proper positioning of the molded contacts upon their metal supports preparatory to permanent attachment thereof by welding or brazing.

Other objects and advantages of the invention will hereinafter appear.

The accompanying drawings illustrate certain embodiments of the invention which will now be described, it being understood that the embodiments illustrated are susceptible of modification of the structural details thereof without departing from the scope of the appended claims.

In the drawings,

Figure 1 is a top plan view of a fine silver backed non-welding contact produced in accordance with my invention.

Fig. 2 is an end view of the contact shown in Fig. 1.

Fig. 3 is a side view of the contact.

Fig. 4 is a side elevational view of a pair of said contacts assembled with respect to a metal support to provide a bridging contactor.

Fig. 5 is a top plan view of the assembly shown in Fig. 4.

Fig. 6 is an end view of said assembly.

Fig. 7 illustrates schematically a fragment of a molding die in which the preforms may be produced.

Fig. 8 is a fragmentary sectional view of the die in which the preform, after heat sintering thereof, is adapted to be molded under high pressure to provide a non-welding, silver backed contact of the desired form.

Fig. 9 is a fragmentary view in section of another form of molding die into which are sequentially deposited a preform composed of fine silver powders and a separately molded preform of powdered contact materials to provide a unitary preform the shape of the upper end of which is indicated by dotted lines in said figure.

Fig. 10 is a fragmentary sectional view of a high pressure molding die in which the preform of Fig. 9, after heat sintering thereof, is molded into a contact of the cross sectional contour illustrated in dotted lines.

Fig. 11 is a top plan view of another form of fine-silver-backed non-welding contact produced in accordance with my invention, the special depending flange or skirt formation being indicated by dotted lines.

Fig. 12 is an end elevation of the contact shown in Fig. 11.

Fig. 13 is a side elevational view of said contact.

Fig. 14 is a top plan view of a combined stationary metal support and wiring terminal with which the contact of Figs. 11 to 13 is adapted to be associated.

Fig. 15 is a front elevational view of the metal member shown in Fig. 14.

Fig. 16 is a side elevational view of said member, and

Figs. 17 and 18 are views similar to Figs. 15 and 16, but with the contact secured in position on the support by welding or brazing.

As is well understood by those skilled in the art, modern lightweight contactors require non-welding contacts for satisfactory operation. Non-welding silver base contacts satisfactory for this service are disclosed in my prior application, Serial No. 525,606, filed March 8, 1944, for Electrical contact materials and contacts and methods of making the same. However, just as such contacts resist welding to each other they also resist attempts to weld or braze them to a suitable metal support. However by providing a fine silver back upon the silver composition contact the same can be welded or brazed to a metal support with the ease and with the same methods that are employed for attaching contacts composed entirely of fine silver.

In accordance with a preferred embodiment of my invention such backing of fine silver is obtained by first depositing in a preform die a sufficient quantity of the powdered non-welding contact material to provide a relatively thick layer, and then depositing upon the leveled top of said thick layer a relatively thin layer of fine silver powders. The two powder layers are then pressed simultaneously to unite the same and form a single contact preform. The molding pressures employed in making such a preform may vary from 10,000 to 50,000 pounds per square inch, depending upon the character of the powders used in the respective layers and upon the final density required for the contact when molded.

The preform is then heat sintered at a temperature of about 1600 degrees F. for about twenty minutes, and molded under heavy pressure (about 100,000 pounds per square inch) into the final form desired for the contact, as disclosed in my aforementioned application, Serial No. 525,606. Shrinkage of the non-welding contact portion of the preform during the heat sintering operation is a function of, or depends upon, the particular composition of the silver base non-welding material employed. The fine silver backing is preferably composed of a mixture of precipitated silver powder and crystalline silver powder in such proportions relatively to each other as to provide the same degree of shrinkage per unit of size as occurs in the non-welding contact portion of the preform under such sintering conditions.

For example, the non-welding contact portion of the preform may consist of a mixture of 82 per cent by weight of Merck's precipitated silver powder and 18 per cent by weight of a mixture of cadmium oxide and cadmium sulphate, wherein 85 per cent of said last mentioned mixture is cadmium oxide and 15 per cent thereof is cadmium sulphate. A fine silver backing to have the same proportional degree of shrinkage as said portion composed of non-welding contact material will preferably be composed of a mixture of 80 per cent by weight of precipitated silver powder and 20 per cent by weight of crystalline silver powder. Although I have found in practice that such shrinkage control of the fine silver backing is obtainable primarily by blending such different types (precipitated and crystalline) of silver powders, in the aforementioned mixture of precipitated and crystalline silver powders I prefer that at least 80 per cent of the quantity of precipitated silver powder shall be adapted to pass through a 300 mesh screen, and that at least 40 per cent of the quantity of crystalline silver powder shall be adapted to pass through a 300 mesh screen.

Referring now to Figs. 1 to 8, inclusive, which illustrate one form of fine silver backed non-welding contact, the method of making the same, and the manner in which the same may be welded or brazed to a suitable metal support or carrier. Thus the numeral 20 (Figs. 1 to 6) designates the main body of a contact composed of non-welding silver base material of the aforementioned character; said body having a relatively thin layer or backing of fine silver 21 (Figs. 2 and 3) integrally united therewith as a result of the aforedescribed preforming heat sintering and final high pressure molding operations.

Referring more particularly to Fig. 7, the numeral 22 designates a cavity of suitable size and shape within a stationary die member, a fragment of which is shown at 23. In practice the cavity 22 may be partially filled, throughout the major portion of its depth as indicated by line 24, with the desired quantity of non-welding contact material 25 of the aforedescribed character in powder form. Suitable means may be provided for leveling said powder as indicated by said line 24. Alternatively the cavity 22 might be assumed to be of such size as to require filling thereof with the powdered material 25 to a level flush with the upper end thereof, after which the male die member 26 might be brought down to the level of line 24 to partially compress said material and simultaneously level the same. In either arrangement the die cavity will thereafter be filled flush with the upper end thereof with an intimate mixture of precipitated and crystalline fine silver powders 27 of the character and in the relative proportions aforementioned. Thereupon the pad 28 is moved downwardly into engagement with die member 23, and the male die 26 is then moved downwardly (under an applied pressure of 10,000 to 50,000 pounds per square inch as aforementioned) to jointly compact the relatively thick and relatively thin layers 25 and 27 to the degree indicated by dotted line 29 (Fig. 7), thus providing an integral slug or preform.

After removal of the preform from the cavity 22 in any suitable or well known manner the same is subjected to the aforementioned temperature of about 1600 degrees F. for a period of about twenty minutes. Such sintering of the preform enhances or improves the character of bonding or cohesion of the particles of which the respective layers are composed and has a similar effect upon the adjacent portions of said layers with respect to each other. More particularly, the fine silver particles act to unite with the adjacent particles of non-welding contact material at the area of interspersion of the two layers with respect to each other as an incident to the preforming pressure. Such heat sintering also results in a predetermined degree of shrinkage of the preform, which shrinkage will be uniform throughout both layers for the reason above set forth. The heat sintered preform 30 is adapted to be freely inserted into the cavity 31 of the stationary member 32 (Fig. 8) of a final molding die.

As shown the cavity 31 may have a concave bottom wall 33 to shape the contact face of the non-welding contact material 34 positioned adjacent thereto, the fine silver backing 35 being positioned uppermost in said cavity 31. The pad 36 is moved downwardly into engagement with the die member 32 and then the male die member is moved downwardly, under an applied pressure of approximately 100,000 pounds per square inch of molding surface to effect final compacting of the preform and molding thereof into a contact of the desired form, as best illustrated in Figs. 1 to 3. As shown in Fig. 8 the male die member 37 is preferably provided with a pair of recesses 38 and 39 which are shaped to provide the bosses or projections 40 and 41 of frusto-conical form. Said bosses are adapted to fit into correspondingly spaced openings in a suitable metal support to facilitate proper positioning of the contact with respect to the support prior to welding or brazing of the former to the latter.

In Figs. 4 to 6 I have shown a metal support 42 having two pairs of openings shown in dotted lines at 43, 44 and 45, 46 (see Fig. 5) to accommodate the bosses upon two of the contacts 20. When the contacts 20 are positioned upon support 42 they may be welded or brazed thereto to permanently electrically and mechanically unite or connect said parts in a well known manner. When brazing or hard-soldering contacts 20 to support 42, I prefer to use the material sold commercially under the trade name of "Silfos." Support 42 is specially formed by beveling the lower end of the peripheral edge thereof as shown at 47 in Figs. 4 and 6; the same is provided with laterally projecting lugs 48 and 49 intermediate the length thereof for cooperation with suitable guides formed upon an insulating base (not shown), and with a countersink or recess 50 in one surface thereof to accommodate one end of an operating plunger (not shown); a compression spring being interposed between the insulating base and surrounding the circular projection upon the lower face of said support 42. Such structural details of support 42, however, form no part of the present invention.

Although as aforedescribed I prefer to simultaneously mold the non-welding contact powder and the fine silver backing powder to provide the preform, it will be apparent to those skilled in the art that other procedures may be followed without any substantial sacrifice of the results herein contemplated. For example the contact and backing powders may be separately pressed into tablet or slug form and the tablets thereafter pressed together; or either powder may be pressed into tablet form and then pressed with the other powder in powder form. In any of these alternative procedures, the tablet or tablets must be pressed or molded at a substantially lower pressure than is employed in molding the final preform in order that a substantial bonding of the materials is insured in the preform.

For example, I have shown in Fig. 9 a fragment of a preform molding device wherein the stationary die member 51 is provided with a specially formed cavity 52 having upwardly sloping or flared peripheral side walls 53 adjacent its bottom wall and a vertical peripheral wall or walls 54 thereabove. Into the recess 52 I may insert a specially formed tablet 55 composed of partially compressed fine silver powders. Tablet 55 may initially seat directly against the bottom wall of recess 52, but is shown as being positioned slightly thereabove. The partially compressed tablet 56 of the non-welding contact composition may initially seat directly against tablet 55, or be spaced slightly thereabove as illustrated. Upon downward movement of the male die member 57 to provide the required degree of preforming molding pressure the upper and lower tablets 56 and 55 will be simultaneously compressed to provide a preform the contour of which is determined by the bottom wall and the flared wall 53 of recess 52 and by the concave lower end 58 of the male die member 57; the upper end of said preform when molded being indicated by the dotted line 59 in Fig. 9. The preform is then heat sintered in the manner aforedescribed to improve the characteristics thereof preparatory to final molding thereof at the aforementioned high pressure in the die shown in Fig. 10. Thus the heat sintered preform 60 (Fig. 10) when deposited in the cavity 61 in the stationary molding die 62 may have the fine silver layer 63 thereof seated against the bottom wall of the cavity, the peripheral side edge or edges 64 of said preform extending upwardly at a greater angle to the horizontal than the angle of the side wall or walls 65 of the lower portion of said cavity. The upper end portion of cavity 60 is provided with a vertical peripheral wall or wall portions 66 to receive with a close sliding fit the lower end of the male die member 67, the latter having a concavity 68 therein to form the convex upper end of the fine-silver-backed non-welding contact in the finally molded condition thereof, as indicated by the dotted line 69 in Fig. 10.

The specially formed fine-silver-backed non-welding contact 70 shown in Figs. 11 to 13 is of approximately rectangular contour (Fig. 11), and the same has a slightly convex contact face 71, as in Figs. 1 to 3. Contact 70 is provided with a depending flange or skirt 72 forming an extension of one long side and the two short sides of the contact, but being omitted at an intermediate portion of the length of the other long side thereof, as indicated at 73 in Figs. 11 and 13. The fine silver backing is preferably embodied in the flat inner surface 74 of the contact and the inner surface 75 of the aforementioned flange 72. Said contact is produced in accordance with one or another of the methods aforedescribed. That is to say, the layers of non-welding contact material and fine silver are molded into a unitary preform which is heat sintered and then molded to the final form illustrated under said high pressure.

Contact 70 is adapted to be permanently attached by welding or brazing to a combined metal support and wiring terminal member 76, shown in Figs. 14 to 18. Thus the flat inner surface 74 of contact 70 is adapted to seat against the flat upper surface 77 of the correspondingly shaped portion 78 of the support. The inner surface of flange 72 is also adapted to surround the peripheral edges of portion 78; the portion of flange 72 omitted at 73 being adapted to accommodate the reduced portion or neck of said support, at 79 in Fig. 14. In attaching contact 70 to portion 77 of the support by brazing I prefer to interpose between the engaging portions of the two parts a coating or quantity of the hard solder or brazing material sold commercially under the trade name of "Silfos." Said neck portion extends laterally at 80 and is formed integrally with a portion extending substantially vertically upward at 81; said lateral and vertical portions preferably having a relatively narrow slot 82 common thereto to increase the resiliency and flexibility thereof. A rectangular terminal portion 83 is formed integrally with vertical portion 81, said terminal portion having a tapped opening 84 therein to accommodate the shank of a binding screw 85.

As will be understood by those skilled in the art, the aforementioned skirt portion 72 of the contact acts to insure against possibility of flow of any of the brazing material, by capillary action or otherwise, to the contact surface 71 of the contact 70. Also the skirt portion or flange 72 serves to strengthen the contact as a whole and to prevent upward curling or separation thereof from the support portion 77 when in use. The additional engagement between the contact 70 and the peripheral edges of portion 78 afforded by flange 72 serves to increase the area of electrical contact between the parts, with a consequent increase in the rate of heat dissipation from the contact to its support in the event of arcing or heating when in use.

I claim:

1. The method of producing a silver base electrical contact having non-welding characteristics at its contact surface when in use, which 2,425,053

7 comprises preforming by molding a body consisting of a relatively thick contact portion composed of a non-welding silver base powder composition and a relatively thin back portion composed of fine silver powders of different types, heat sintering said preformed body at a temperature of about 1600 degrees F. for a period of about twenty minutes to shrink all portions thereof to corresponding degrees, and then molding said preformed body at a high pressure to provide a finished contact the fine silver portion of which may be welded or brazed to a metal support.

2. The method of producing a silver base electrical contact having non-welding characteristics at its contact surface when in use, which comprises initially producing by molding under relatively low pressure a preform consisting of a relatively thick portion of contact material comprising a mixture of silver, cadmium oxide and cadmium sulphate in powder form and a relatively thin backing portion comprising fine silver powders of different types, heat sintering said preform at a temperature of about 1600 degrees F. for a period of about twenty minutes, and then molding said sintered preform at a pressure of about one hundred thousand pounds per square inch to provide a finished contact the backing portion of which may be readily attached to a metal support by welding or brazing.

3. The method of producing a silver composition electrical contact having non-welding characteristics at its contact surface when in use, which comprises partially filling a mold cavity with a predetermined quantity of said silver composition in powder form, then filling the remainder of said mold cavity with a predetermined quantity of fine silver in powder form, then jointly molding said powders at a relatively low pressure to provide a preform, heat sintering said preform at a temperature of about 1600 degrees F. for a period of about twenty minutes, and then molding the same at a relatively high pressure to provide a finished contact the fine silver end of which may be readily welded or brazed to a suitable metallic support.

4. The method of producing a silver base electrical contact having non-welding characteristics when in use and adapted for attachment to a metal support by welding or brazing, which comprises sequentially inserting into a mold cavity a relatively large quantity of the silver base material in powder form and a relatively small quantity of fine silver in powder form, simultaneously molding said powders under a pressure of ten thousand to fifty thousand pounds per square inch to provide a preform, thereafter subject said preform to a temperature of approximately 1600 degrees F. for a period of about twenty minutes, and thereafter remolding said preform to the desired final shape and size at a pressure of approximately one hundred thousand pounds per square inch.

5. The method of producing a silver base electrical contact having non-welding characteristics when in use and adapted for attachment to a metal support by welding or brazing, which comprises sequentially inserting into a mold cavity a relatively large quantity of the silver base material in powder form and a relatively small quantity of fine silver in powder form, said silver base material being composed of approximately eighty-two per cent by weight of Merck's precipitated silver powder and about eighteen per cent of a mixture of about eighty-

8 five per cent of cadmium oxide and about fifteen per cent of cadmium sulphate, said fine silver being composed of about eighty per cent of Merck's precipitated silver powder and about twenty per cent of crystalline silver powder, simultaneously molding said powders under a pressure of ten thousand to fifty thousand pounds per square inch to provide a preform, thereafter subjecting said preform to a temperature of approximately 1600 degrees F. for a period of about twenty minutes, and thereafter remolding said preform to the desired final shape and size at a pressure of approximately one hundred thousand pounds per square inch.

6. The method of producing an electrical contact having non-welding characteristics at its contact surface when in use, which comprises preforming by molding at a relatively low pressure a body consisting of a relatively thick contact portion composed of a powdered mixture of predetermined proportions of a metal of good electrical conductivity, a metallic oxide and a metallic salt, and a relatively thin back portion consisting of predetermined proportions of precipitated silver powder and crystalline silver powder, heat sintering said preformed body at a temperature of about 1600 degrees F. for a period of about twenty minutes to shrink all portions thereof to like degrees, and then molding said preformed body at a relatively high pressure to provide a finished contact the silver back portion of which may be welded or brazed to a metal support.

7. A molded electrical contact having non-welding characteristics at its contact surface when in use, said contact consisting of a relatively thick layer composed of approximately eighty-two per cent by weight of precipitated silver powder and about eighteen per cent of a mixture of about eighty-five per cent of cadmium oxide and about fifteen per cent of cadmium sulphate, and a relatively thin integral backing layer of fine silver composed of about eighty per cent of precipitated silver powder and about twenty per cent of crystalline silver powder, whereby said contact is adapted for attachment to a metal support by welding or brazing.

8. As an article of manufacture, a molded preform adapted for use in the production of an electrical contact having non-welding characteristics at its contact surface when in use, said preform consisting of a relatively thick layer composed of approximately eighty-two per cent by weight of precipitated silver powder and about eighteen per cent of a mixture of about eighty-five per cent of cadmium oxide and about fifteen per cent of cadmium sulphate, and a relatively thin integral backing layer of fine silver composed of about eighty per cent of precipitated silver powder and about twenty per cent of crystalline silver powder.

MERLE R. SWINEHART.

REFERENCES CITED

The following references are of record in the file of this patent:

UNITED STATES PATENTS

| Number | Name | Date |
|---|---|---|
| 1,986,224 | Sanders | Jan. 1, 1935 |
| 2,278,592 | Sanders | Apr. 7, 1942 |
| 2,199,240 | Gwyn | Apr. 30, 1940 |
| 2,288,122 | Cox | June 30, 1942 |
| 2,307,668 | Cox | Jan. 5, 1943 |